(12) United States Patent
Maatta et al.

(10) Patent No.: US 9,442,530 B2
(45) Date of Patent: Sep. 13, 2016

(54) FOLDABLE DEVICE

(71) Applicant: Nokia Corporation, Espoo (FI)

(72) Inventors: Esa-Sakari Maatta, Espoo (FI); Ilpo Kauhaniemi, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 74 days.

(21) Appl. No.: 14/096,889

(22) Filed: Dec. 4, 2013

(65) Prior Publication Data

US 2015/0153780 A1 Jun. 4, 2015

(51) Int. Cl.
*G06F 1/16* (2006.01)

(52) U.S. Cl.
CPC .......... *G06F 1/1656* (2013.01); *G06F 1/1652* (2013.01); *G06F 1/1679* (2013.01)

(58) Field of Classification Search
CPC ... G06F 1/1656; G06F 1/1679; G06F 1/1652
USPC .................... 361/681–683, 679.26
See application file for complete search history.

(56) References Cited

U.S. PATENT DOCUMENTS

| 6,377,324 | B1* | 4/2002 | Katsura | G02F 1/133305 349/58 |
| 6,577,496 | B1* | 6/2003 | Gioscia et al. | 361/679.3 |
| 2006/0050169 | A1* | 3/2006 | Misawa | G06F 1/1616 348/333.06 |
| 2007/0297125 | A1 | 12/2007 | Maatta | |
| 2012/0044620 | A1* | 2/2012 | Song | G06F 1/1616 361/679.01 |
| 2012/0243207 | A1* | 9/2012 | Wang | G06F 9/301 362/97.1 |
| 2014/0111954 | A1 | 4/2014 | Lee et al. | |

FOREIGN PATENT DOCUMENTS

EP    2546721    1/2013

OTHER PUBLICATIONS

International Search Report for International Application No. PCT/FI2014/050862—Date of Completion of Search: Jan. 29, 2015, 3 pages.
PCT Written Opinion of the International Searching Authority for International Application No. PCT/FI2014/050862—Date of Completion of Opinion: Jan. 29, 2015, 6 pages.

* cited by examiner

*Primary Examiner* — Tuan T Dinh
*Assistant Examiner* — Rockshana Chowdhury
(74) *Attorney, Agent, or Firm* — Locke Lord LLP

(57) ABSTRACT

An apparatus including: housing parts foldably connected to each other, the housing parts being configured to be movable between an open configuration and a closed configuration; a display assembly pivotably connected to the housing parts, wherein the display assembly comprises a flexible display part; the flexible display part is configured to bend in response to a closing movement of the housing parts; and the display assembly is configured to be retracted inside a space defined by the housing parts in response to a closing movement of the housing parts.

15 Claims, 11 Drawing Sheets

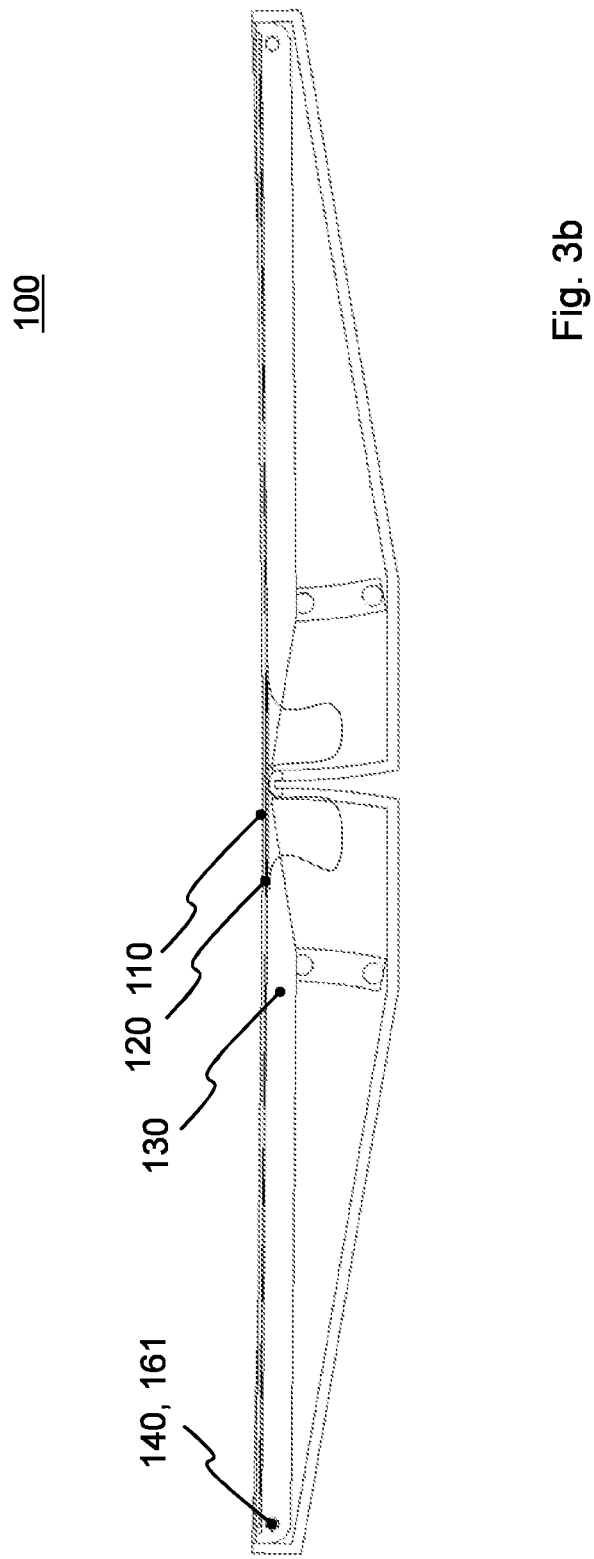

FOLDABLE DEVICE

TECHNICAL FIELD

The present invention generally relates to foldable electronic devices.

BACKGROUND ART

Electronic devices such as mobile phones, tablets or other handheld or portable devices may comprise a foldable structure. There may be for example an open configuration and a closed configuration for different purposes.

SUMMARY

According to a first example aspect of the invention there is provided an apparatus comprising
  housing parts foldably connected to each other, the housing parts being configured to be movable between an open configuration and a closed configuration;
  a display assembly pivotably connected to the housing parts, wherein
  the display assembly comprises a flexible display part;
  the flexible display part is configured to bend in response to a closing movement of the housing parts; and
  the display assembly is configured to be retracted inside a space defined by the housing parts in response to a closing movement of the housing parts.

In an embodiment a force applied to the apparatus to move the housing parts towards the closed configuration is configured to cause retraction of the display assembly inside the space defined by the housing parts.

In an embodiment the flexible display part extends over a surface of each housing part.

In an embodiment the display assembly is configured to be moved outward in the space defined by the housing parts in response to an opening movement of the housing parts.

In an embodiment the display assembly comprises frame parts pivotably connected to the housing parts and wherein the flexible display part is assembled on the frame parts.

In an embodiment the frame parts are configured to meet inner wall of the housing parts in the closed configuration.

In an embodiment, in the closed configuration the housing parts are folded against each other and the flexible display part is hidden in a bent position inside a space defined by the housing parts.

In an embodiment, in the open configuration the housing parts are folded away from each other and the flexible display part is exposed.

In an embodiment the apparatus further comprises a locking mechanism configured to lock the display assembly into a certain position in dependence of the configuration of the housing parts.

In an embodiment the apparatus further comprises a locking mechanism configured to lock the display assembly into at least one of the following positions in dependence of the configuration of the housing parts: an open position, a closed position and an intermediate position.

In an embodiment the housing parts are made of rigid material. In an embodiment at least one of the housing parts comprises at least one resilient section. In an embodiment at least one of the housing parts comprises at least partially resilient structure.

According to a second example aspect of the invention there is provided a method comprising controlling a device comprising a foldable housing structure and a display assembly pivotably connected to the housing structure, the display assembly comprising a flexible display part,
bending the flexible display part and retracting the display assembly inside the housing structure in response to the device being folded towards a closed configuration.

In an embodiment the method further comprises causing retraction of the display assembly inside the housing structure in response to a force being applied to the device to fold the device towards the closed configuration.

In an embodiment the method further comprises moving the display assembly outward in response to an opening movement of the device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which:

FIG. 3b shows a cross-sectional side view of an apparatus according to an example embodiment of the invention in an open configuration;

DETAILED DESCRIPTION

Figure 1:
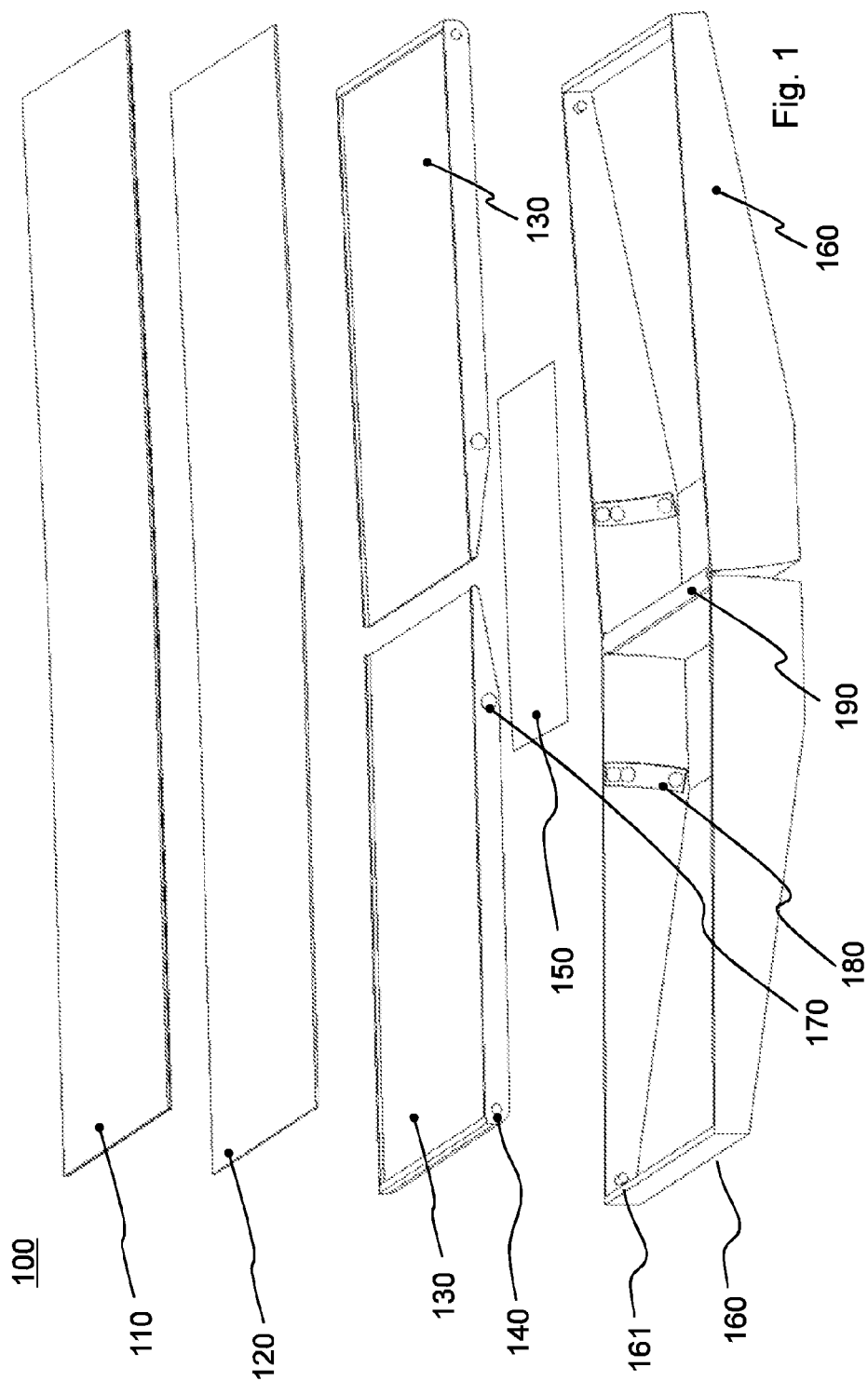
FIG. 1 shows an exploded view of an apparatus according to an example embodiment of the invention.

Some example embodiments of the present invention and potential advantages are understood by referring to FIGS. 1 through 13 of the drawings. In this document, like reference signs denote like parts or steps.

In an example embodiment there is provided a (hard shell) folding device suitable for accommodating a flexible or bendable display that extends over at least two movable housing parts of the device. In this way it is possible to provide a pocket size device with a relatively large display (for example a 6, 7 or 8 inch display or larger). For transport or storage the display is folded into a hard shell casing for maximal protection.

A bendable display may require a relatively large bending radius. All folding device structures cannot necessarily accommodate a bending display that extends over different folding parts. In an example embodiment there is provided a mechanism configured to retract a bendable display inside a device housing structure as the device folds. In an example embodiment this is achieved with a pivoting connection between the folding housing structure and the display. In this way the bending radius of the bendable display can be accommodated without extensively increasing thickness of the device.

In an example embodiment there is provided a device comprising two device covers or housing parts connected to each other with a hinge. The hinge may be an integral hinge or a separate conventional hinge. A display assembly with a flexible display is fitted into the housing parts. The display assembly comprises frame parts pivotably connected to the housing parts and a flexible display part mounted on the frame parts. As the device is being closed, i.e. as the covers are folded against each other, the frame parts are retracted into the device covers thereby retracting the flexible display inside the device covers and making room for the flexible display to bend.

In an example embodiment there is a device with a rectangular display assembly that comprises pivoting mechanisms on two opposite sides of the rectangular display assembly. The display assembly comprises a flexible bendable display element. The display assembly is configured to be fitted into a rectangular foldable housing structure. When the housing structure is folded into a closed configuration opposite ends of the housing structure are configured to meet each other. These opposite ends of the housing structure comprise pivoting mechanisms configured to mate with the pivoting mechanisms in the display assembly. The pivoting mechanisms in the display assembly and the housing structure connect the display assembly and the housing structure to each other.

It is noted that various example embodiments disclosed herein relate to an embodiment comprising two folding device covers or housing parts, but this is only one example. Also some other foldable housing structure with any suitable number of housing parts is possible. There could be for example three or four housing parts forming the housing structure. Likewise various disclosed example embodiments relate to a hard shell structure, but also this is only one example. In alternative embodiments the cover or housing parts can be at least partially flexible or soft. In an example embodiment there can be a plurality of rigid housing parts providing partially flexible, folding housing structure.

FIG. 1 shows an exploded view of an apparatus 100 according to an example embodiment of the invention. The apparatus 100 is for example a tablet computer, a personal digital assistant, a smartphone, a media player, an e-book reader, a display or a flat-screen television. The apparatus 100 comprises a flexible display part 110, a metal spring 120 and frame parts 130. The flexible display is configured to be assembled on the spring 120 and the spring 120 is configured to be assembled on the frame parts 130. In an example embodiment the frame parts 130 comprise printed wiring board, PWB, and electronics (not shown for the sake of clarity).

In an example embodiment the display part 110 is a touch sensitive display that comprises a touch sensor for detecting the touch of the user on or in proximity thereof. In an example embodiment, the touch sensor comprises a resistive, a surface acoustic wave, a capacitive—such as a surface capacitance, a projected capacitance, a mutual capacitance, or self-capacitance—an infrared, an optical, a dispersive signal and/or acoustic pulse recognition touch sensor or an array thereof.

The display part 110 can be made of plastic, thin glass, thin metal or elastomer for example and, in a further example embodiment, the display part can comprise resilient materials, such as a gel, an elastomer, foam, rubber or silicone or other resilient structures such as hollow, woven, folded or coiled structures, or a folding membrane of e.g. thin polymer of fabric.

In an example embodiment the display part 110, the metal spring 120 and the frame parts 130 form a display assembly configured to be fitted on a device housing. In other example embodiments a display assembly can comprise other alternative or additional parts.

Further, the apparatus 100 comprises a flexi connector 150, housing parts 160, and a hinge 190. The flexi 150 is for connecting PWBs. The hinge 190 is for foldably connecting the housing parts 160 to each other. In the shown example the hinge 190 is an integral hinge, a so called living hinge. Alternatively, a conventional hinge could be used. Still further the frame parts 130 comprise a pivot hole 140 and the housing parts 160 comprise a pivot axis configured to be fitted into the pivot hole 140 thereby providing a pivotable connection of the frame parts 130 (or the display assembly) to the housing parts 160. It is to be noted that also some other pivoting structure or connection can be used. Further the housing parts 160 and the frame parts comprise locking or guiding mechanisms 170 and 180. In an example embodiment the locking mechanisms 170 and 180 comprise balls and holes configured to receive the balls. It is to be noted that also some other locking mechanism can be used. In an example embodiment the locking mechanisms 170 and 180 are configured to lock the frame parts 130 (or the display assembly) into certain different positions in relation to the housing parts 160. In an example embodiment the locking mechanisms 170, 180 are configured to lock the frame parts (or the display assembly) to an open position and/or to a closed position. Additionally there may be one or more intermediate locking positions. There may be for example a half open (or partially open) locking position and/or a half closed (or partially closed) locking position.

In an example embodiment the housing parts 160 are hard covers providing mechanical protection to the apparatus 100. In another example embodiment the housing parts 160 are at least partially flexible or resilient. In an example embodiment the housing parts 160 can be made of plastic, Of metal, composites or combinations thereof. In an embodiment the housing parts 160 comprise a mechanical structure allowing at least partial flexibility of the housing parts or the housing parts 160 comprise flexible or resilient material.

Figure 2:
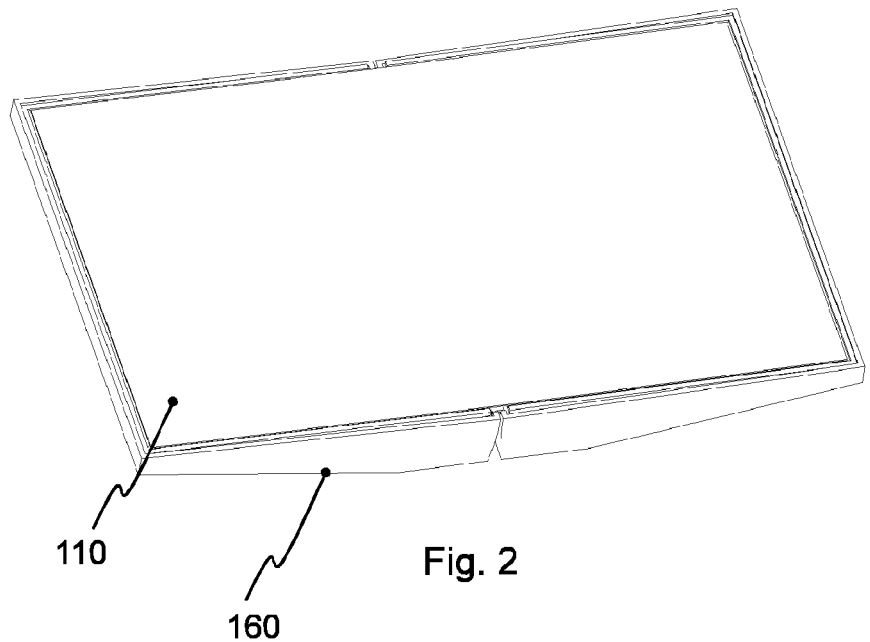
FIG. 2 shows a schematic view of an apparatus according to an example embodiment of the invention in an open configuration.

FIG. 2 shows a schematic view of an apparatus 100 according to an example embodiment of the invention in an open configuration. The housing parts 160 are folded fully open and the display part 110 is unbent and fully exposed. As it can be seen in FIG. 2, the display part 110 extends over inner surfaces of both housing parts 160.

Figure 3A:
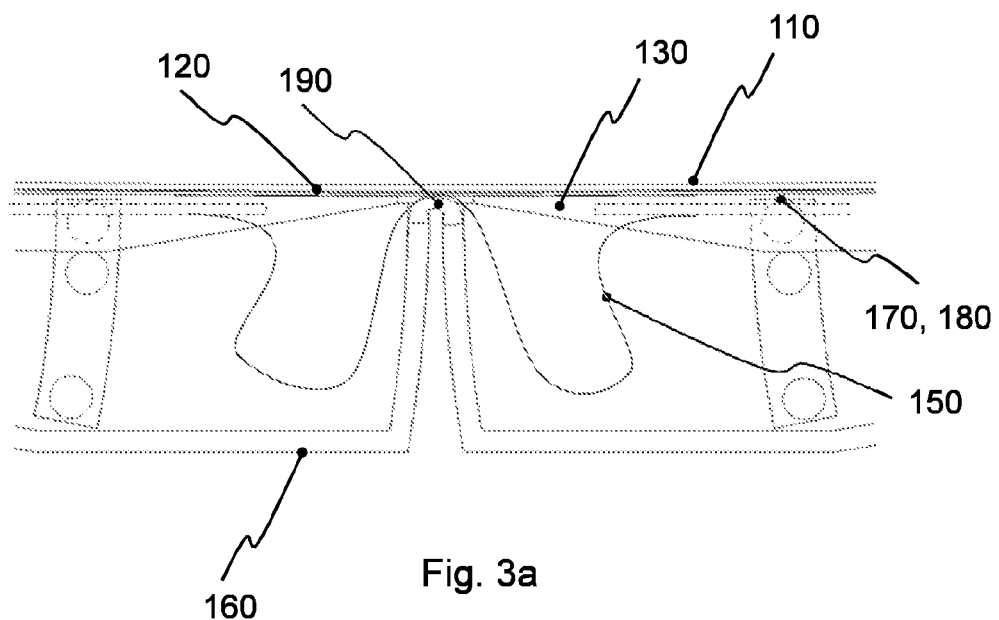
FIG. 3a shows a cross-sectional side view of an apparatus according to an example embodiment of the invention in an open configuration.

FIG. 3a shows a cross-sectional side view of an apparatus 100 according to an example embodiment of the invention in an open configuration. The hinge 190 is fully folded and the spring 120 (and the display part 110 on top of the spring 120) rests on the hinge 190. The locking mechanism 170, 180 locks the display assembly to an open position and stops the frame part 130 from moving too far out from the housing part 160. In an example embodiment, the flexi 150 is attached to a PWB on the frame part 130 with an AFC bonding or connector.

FIG. 3b shows a cross-sectional side view of an apparatus 100 according to an example embodiment of the invention in an open configuration. The display part 110 and the spring 120 are fully open. The frame 130 doubles up as a support for the display part. The pivot 140, 161 provides tension for the display part keeping it straight.

Figure 4:
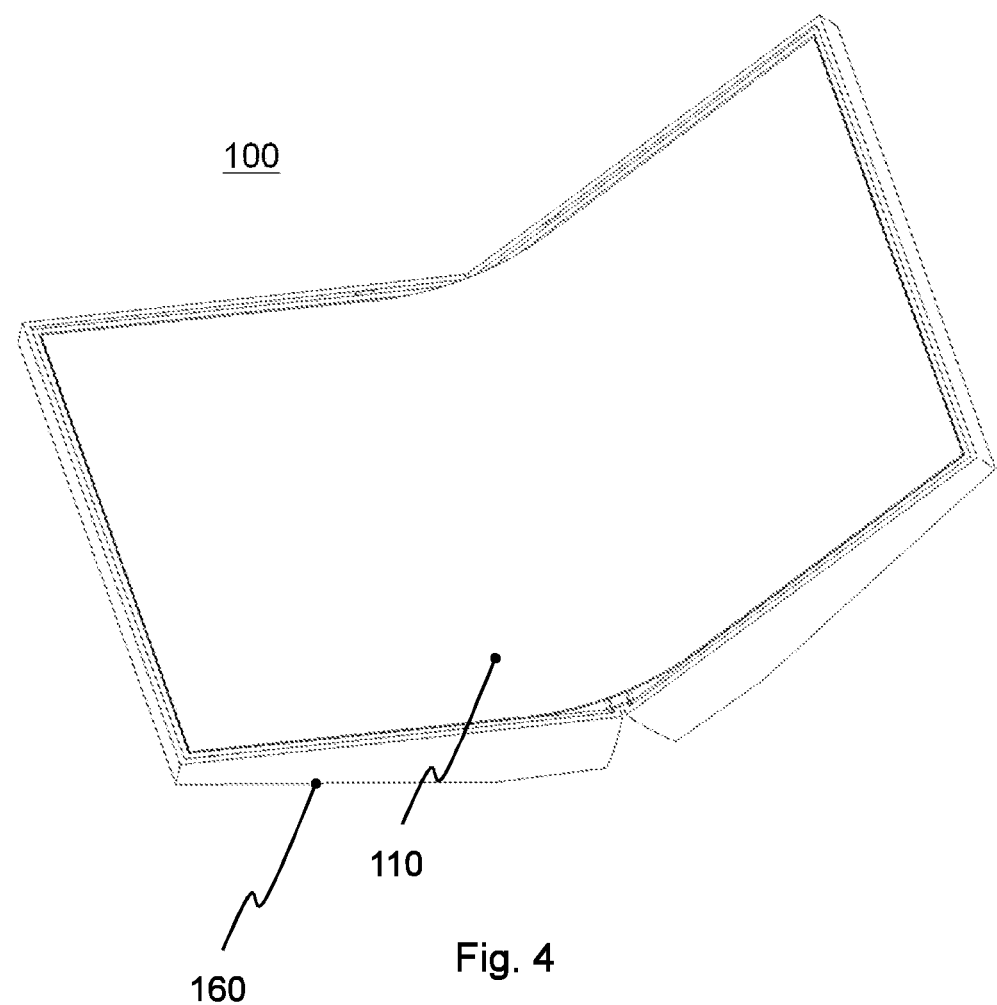
FIG. 4 shows a schematic view of an apparatus according to an example embodiment of the invention in a half-open configuration.

FIG. 4 shows a schematic view of an apparatus 100 according to an example embodiment of the invention in a half-open configuration. The display part 110 and the spring underneath are bending together as the housing parts 160 are folded from an open configuration towards a closed configuration. Energy is being loaded on the spring as it is being bent. This energy will be used to open up the apparatus when the housing parts 160 are unfolded into an open configuration in some later phase.

Figure 5:
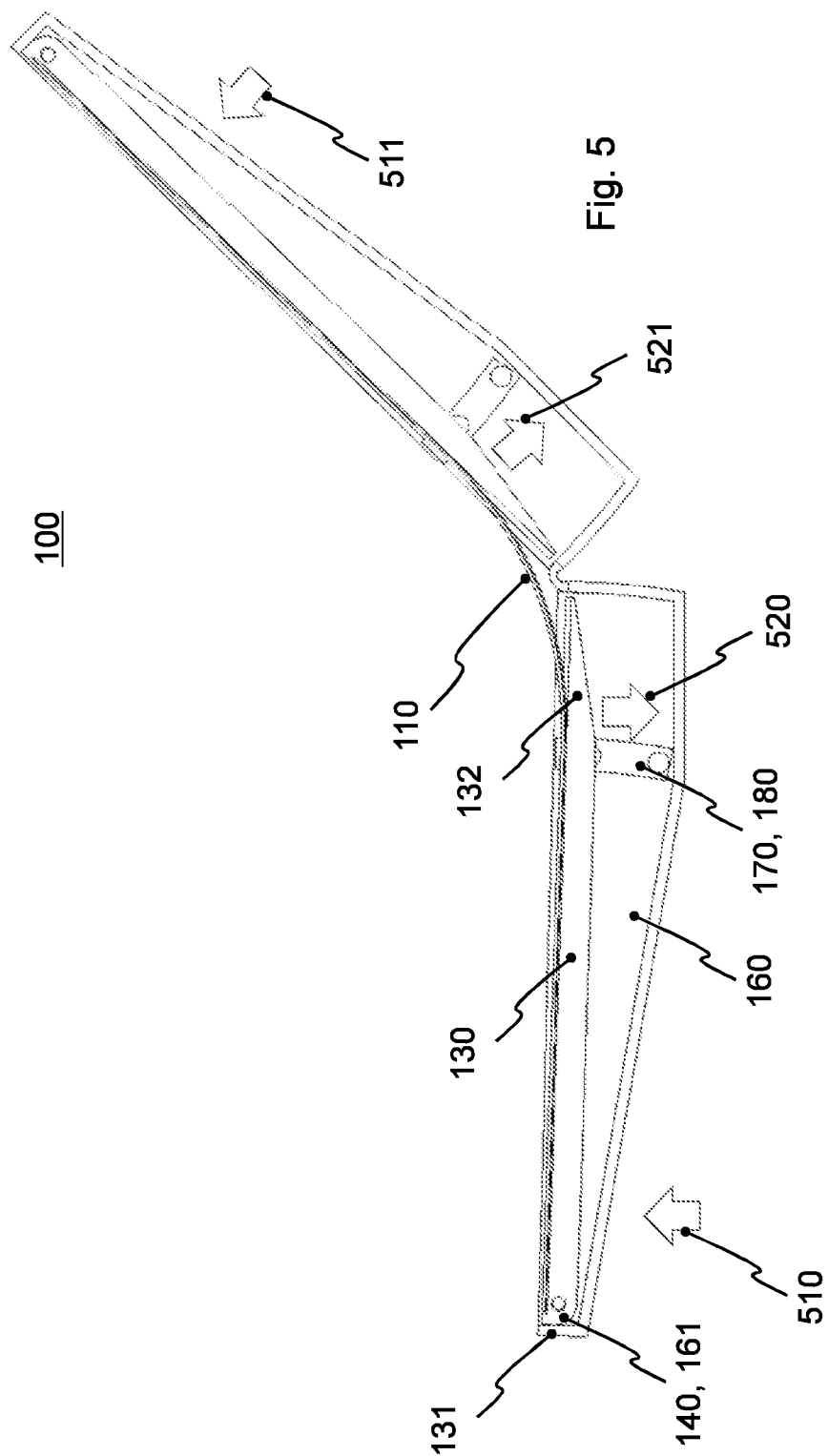
FIG. 5 shows a cross-sectional side view of an apparatus according to an example embodiment of the invention in a half-open configuration.

FIG. 5 shows a cross-sectional side view of an apparatus 100 according to an example embodiment of the invention in a half-open configuration. As the housing parts 160 are folded towards the closed configuration, a force illustrated with arrows 510, 511 is applied to the apparatus 100 and this folding force 510, 511 causes that the frame parts 130 are retracted inside the housing parts 160. The pivoting connections 140, 161 keep one end 131 of the frame parts 130 connected to the housing parts 160, but the other end 132 of the frame parts 130 is free to move within the housing parts 160. The arrows 520, 521 illustrate the movement of the frame parts 130.

In an example embodiment the frame parts 130 are retracted towards an intermediate locking position in the locking mechanism 170, 180. In an example embodiment, the locking mechanism 170, 180 is such that it provides friction but does not completely prevent movement of the frame part 130. Thereby, as the force 510, 511 is applied the frame parts 130 are allowed to move along the locking mechanism 170, 180. The display part 110 is assembled on the frame part (with the spring 120 between them) and thereby also the display part 110 is retracted inside the housing part 160 into a space defined by the housing part 160.

Figure 6:
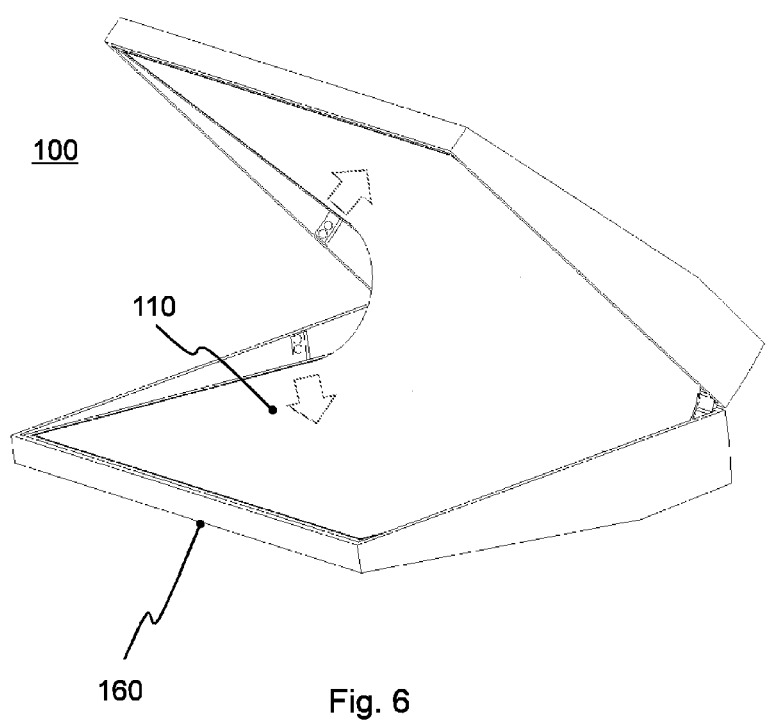
FIG. 6 shows a schematic view of an apparatus according to an example embodiment of the invention in a half-closed configuration.

FIG. 6 shows a schematic view of an apparatus 100 according to an example embodiment of the invention in a half-closed configuration. The display assembly (comprising the display part 110, the spring and the frame parts) is retracted further inside the housing parts 160 as the housing parts 160 are further folded. The arrows in FIG. 6 illustrate the movement of the display assembly.

Figure 7:
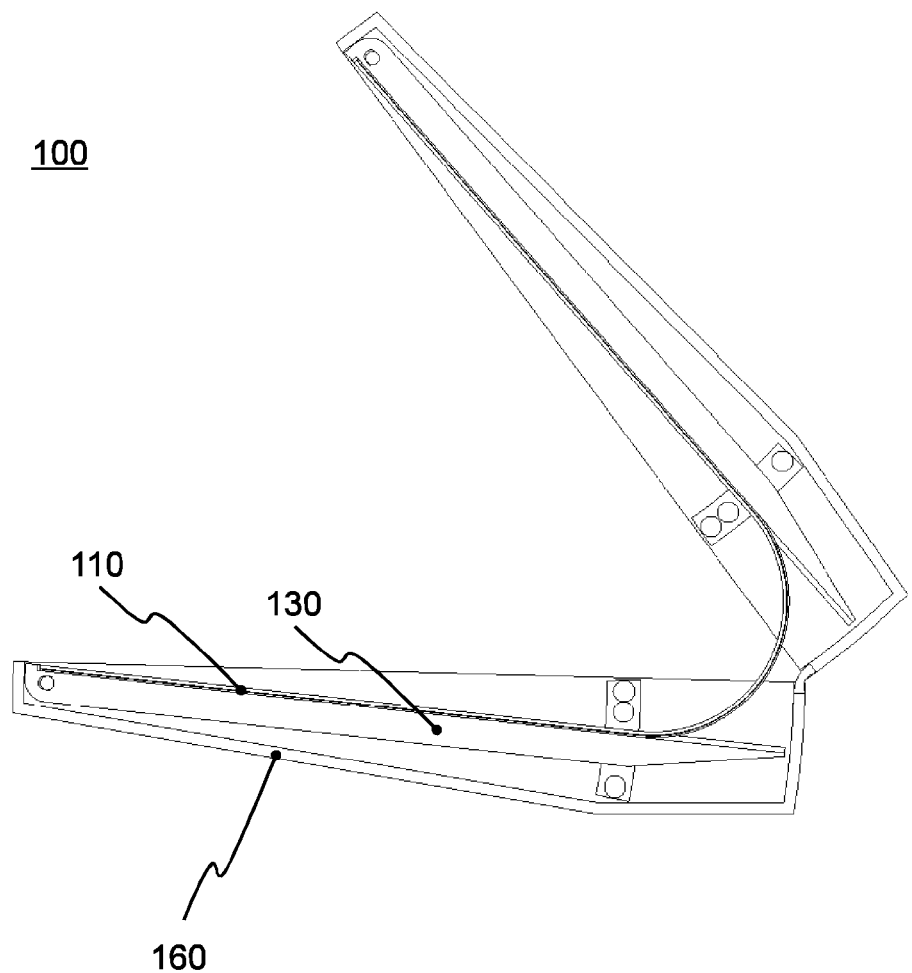
FIG. 7 shows a cross-sectional side view of an apparatus according to an example embodiment of the invention in a half-closed configuration.

FIG. 7 shows a cross-sectional side view of an apparatus 100 according to an example embodiment of the invention in a half-closed configuration. The frame part 130 and the display part 110 are shown half way inside the housing part 160.

Figure 8A:
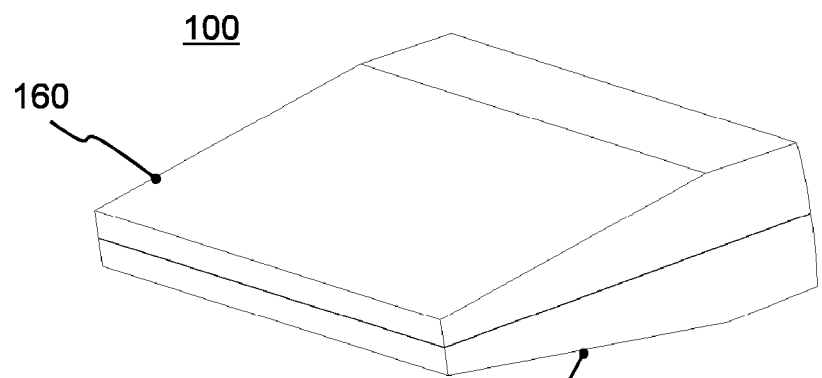
FIG. 8a shows a schematic view of an apparatus according to an example embodiment of the invention in a closed configuration.
Figure 8B:
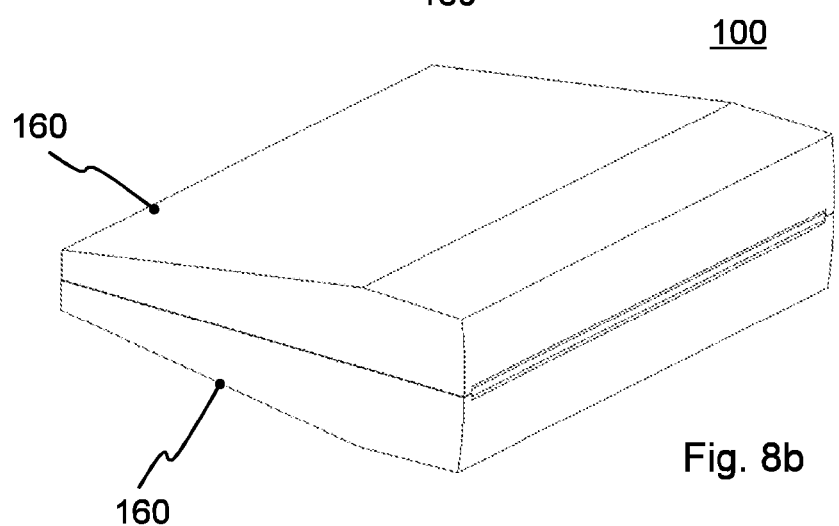
FIG. 8b shows a schematic view of an apparatus according to an example embodiment of the invention in a closed configuration.

FIGS. 8a and 8b shows a schematic view of an apparatus 100 according to an example embodiment of the invention in a closed configuration. The housing parts 160 are fully folded against each other and a closed space is defined inside the housing parts.

Figure 9:
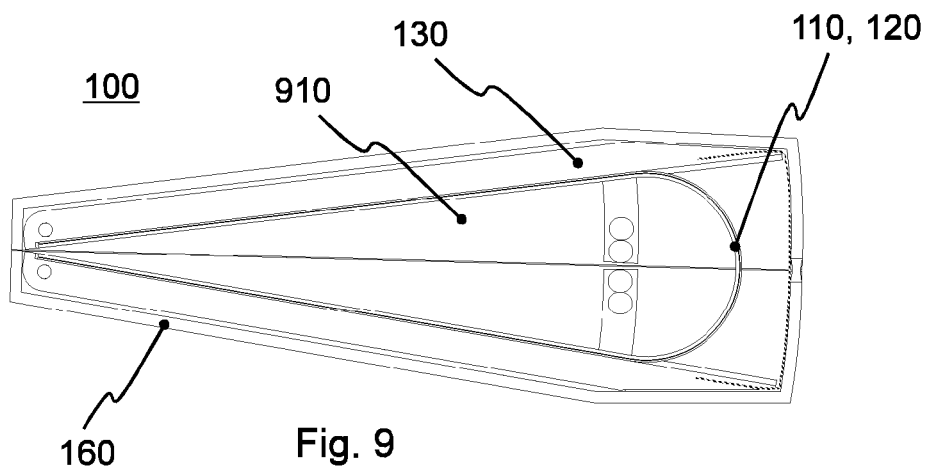
FIG. 9 shows a cross-sectional side view of an apparatus according to an example embodiment of the invention in a closed configuration.

FIG. 9 shows a cross-sectional side view of an apparatus according to an example embodiment of the invention in a closed configuration. The display part 110 and the spring 120 are fully bent and the frame 130 meets the housing 160. In an example embodiment, the form of the inner wall of the housing part 160 and the form of the frame part 130 are configured to fit to each other so that the housing part 160 smoothly receives the frame part 130. The space 910 formed inside the housing parts 160 is configured to accommodate the bending radius of the display part 110.

Figure 10:
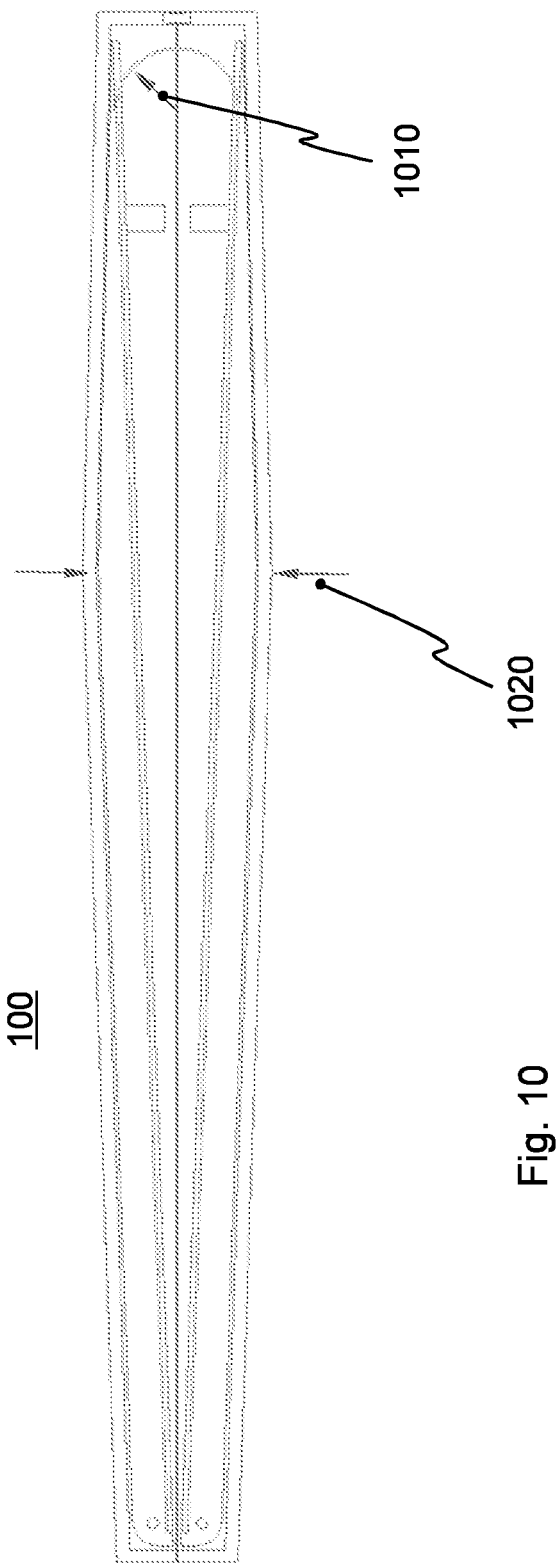
FIG. 10 shows a cross-sectional side view of an apparatus according to an example embodiment of the invention in a closed configuration.

FIG. 10 shows a cross-sectional side view of an apparatus according to an example embodiment of the invention in a closed configuration. The Figure illustrates an example apparatus wherein a display bending radius 1010 is 4.1 mm and thickness 1020 of the apparatus 100 is 14.2 mm. However this is just one example and the mechanisms disclosed herein are scalable to different device thicknesses and display bending radiuses. For comparison it is mentioned that a similar display bending radius of 4.1 mm translates into a device thickness of 20 mm in a mesh hinge concept.

Figure 11A:
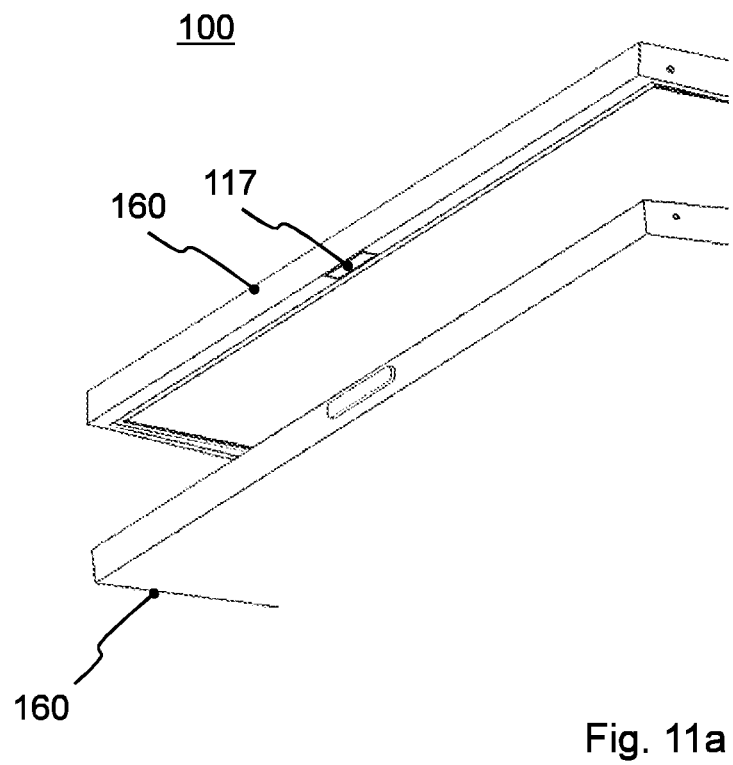
FIG. 11a shows a schematic view of a locking mechanism in an apparatus according to an example embodiment of the invention.
Figure 11B:
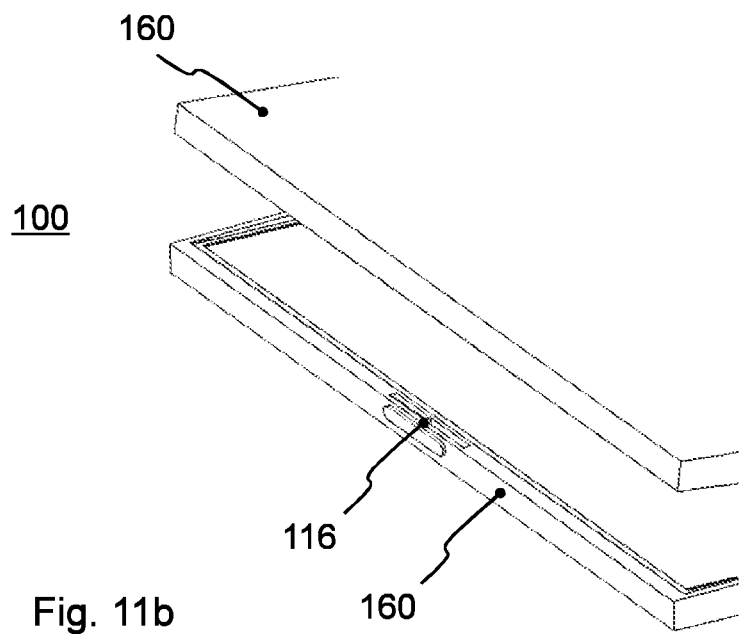
FIG. 11b shows a schematic view of a locking mechanism in an apparatus according to an example embodiment of the invention.

FIGS. 11a and 11b show a schematic view of a locking mechanism in an apparatus 100 according to an example embodiment of the invention. In the closed configuration the housing parts 160 are locked to each other with a locking mechanism 116, 117. The example locking mechanism that is shown is a magnetic latch. There is a moving magnet 116 on one of the housing parts 160 and a piece of steel 117 mounted on the other housing part 160. The housing parts 160 are released open by moving the magnet 116.

Figure 12:
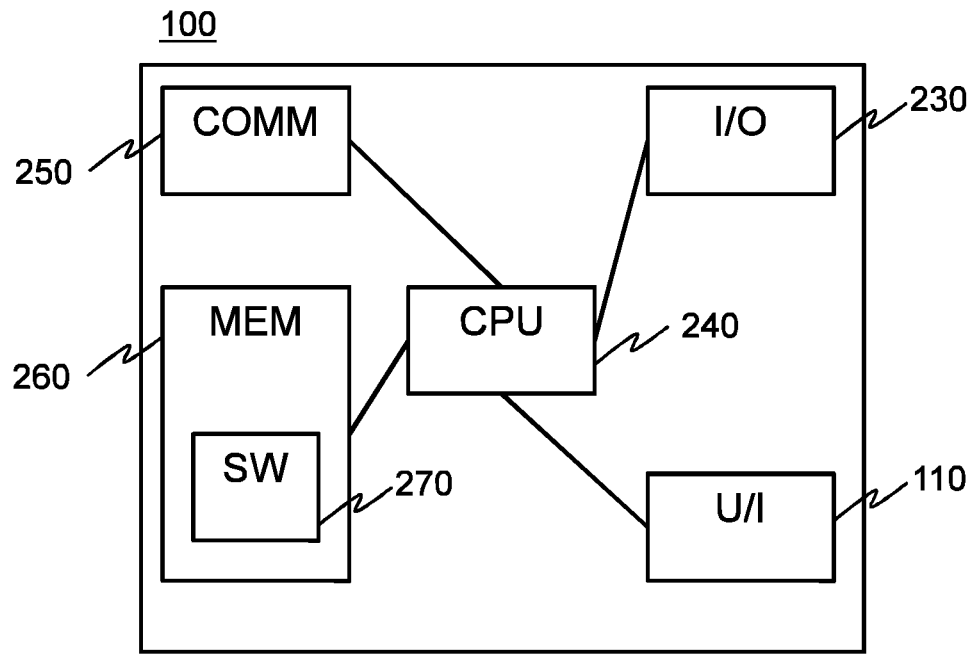
FIG. 12 shows a schematic block diagram of an apparatus according to an example embodiment of the invention.

FIG. 12 shows a schematic a block diagram of an apparatus 100 of an example embodiment. The apparatus 100 comprises a communication interface module 250, a processor 240 coupled to the communication interface module 250, and a memory 260 coupled to the processor 240. The apparatus further comprises and input/output (I/O) unit 230 and the user interface (U/I) unit 110, such as a flexible display, which are coupled to the processor 240.

The memory 260 comprises a work memory and a non-volatile memory such as a read-only memory, flash memory, optical or magnetic memory. In the memory 260, typically at least initially in the non-volatile memory, there is stored software 270 operable to be loaded into and executed by the processor 240. The software 270 may comprise one or more software modules and can be in the form of a computer program product that is software stored in a memory medium. In the context of this document, a "memory medium" may be any non-transitory media or means that can contain, store, communicate, propagate or transport the instructions for use by or in connection with an instruction execution system, apparatus, or device, such as a computer.

It shall be understood that any coupling in this document refers to functional or operational coupling; there may be intervening components or circuitries in between coupled elements unless expressly otherwise described.

The communication interface module 250 is configured to provide local communications over one or more local links. The links may be wired and/or wireless links. The communication interface 250 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The communication interface 250 may be integrated into the apparatus 100 or into an adapter or card that may be inserted into a suitable slot or port of the apparatus 100. While FIG. 12 shows one communication interface 250, the apparatus may comprise a plurality of communication interfaces 250. In a further example embodiment, the apparatus 100 further comprises a near field communication (NFC) unit.

The processor 240 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 12 shows one processor 240, but the apparatus 100 may comprise a plurality of processors.

As mentioned in the foregoing, the memory 260 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage or a smart card. In some example embodiments, only volatile or non-volatile memory is present in the apparatus 100. Moreover, in some example embodiments, the apparatus comprises a plurality of memories. In some example embodiments, various elements are integrated. For instance, the memory 260 can be constructed as a part of the apparatus 100 or inserted for example into a slot or a port. Further still, the memory 260 may serve the sole purpose of storing data, or it may be constructed as a part of an apparatus serving other purposes, such as processing data. Similar options are thinkable also for various other elements.

In addition to the elements shown in FIG. 12, the apparatus 100 may comprise other elements, such as microphones, displays, as well as additional circuitry such as a camera unit, further input/output (I/O) circuitries, memory chips, application-specific integrated circuits (ASIC), processing circuitry for specific purposes such as source coding/decoding circuitry, channel coding/decoding circuitry and ciphering/deciphering circuitry. Additionally, the apparatus 100 may comprise a disposable or rechargeable battery (not shown) for powering the apparatus if external power supply is not available.

It is also useful to realize that the term apparatus is used in this document with varying scope. In some of the broader claims and examples, the apparatus may refer to only a subset of the features presented in FIG. 12 or even be implemented without any one of the features of FIG. 12. In an example embodiment term apparatus refers to the processor 240.

Figure 13:
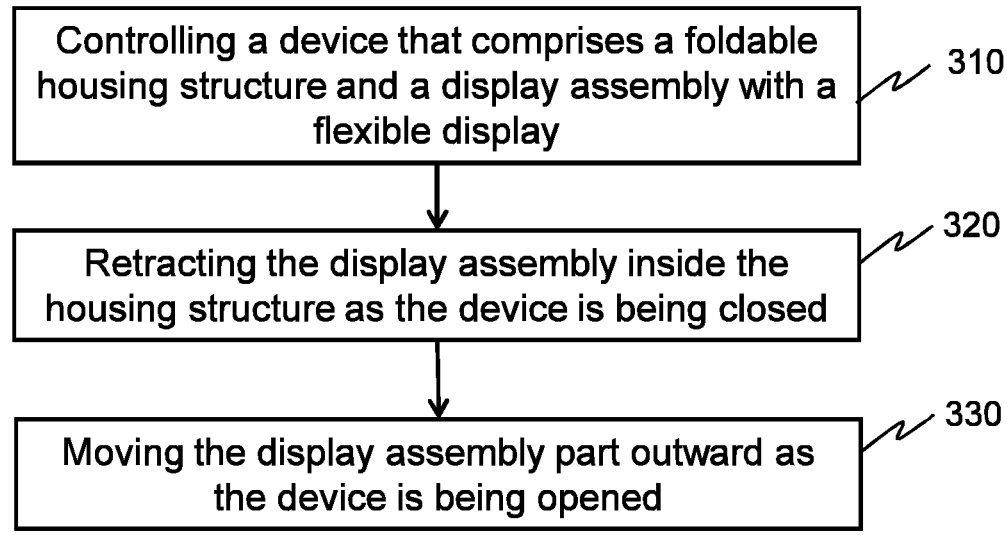
FIG. 13 shows a flow diagram illustrating a method according to an example embodiment of the invention.

FIG. 13 shows a flow diagram illustrating a method according to an example embodiment of the invention. The method may be performed for example in the apparatus 100 of previous Figures. In phase 310 of the method, a device that comprises a housing structure and a display assembly comprising a flexible or bendable display part is controlled. In an example embodiment the housing structure comprises housing parts that are foldably connected to each other. In a further embodiment the housing structure is made of a hard or tough or substantially inflexible material. In a further embodiment the housing structure is bendable or soft at least to some extent, or the housing structure may include resilient parts or sections. In an example embodiment the display assembly is pivotably connected to the housing structure.

In phase 320, the flexible display part is being bent and the display assembly is being retracted inside the housing structure (inside a space defined by the housing structure) as the device is being closed, i.e. the device is folded from an open or partially open configuration towards a closed configuration. In an example embodiment, a force is applied to the housing parts to fold the housing parts and this force causes the retracting of the display assembly and loads energy into the display assembly. In phase 330, the display assembly is pushed or moved outward (within the space defined by the housing structure) as the device is being opened or unfolded, i.e. the device is unfolded from a closed or partially closed configuration towards an open configuration. In an example embodiment, the energy loaded into the display assembly is released as the device is being opened and this energy unfolds the flexible display and pops up the device. In an example embodiment the energy is loaded into a spring element comprised in the display assembly.

Within the scope of appended claims there are various apparatus structures that enable the retracting and the pushing in phases 320 and 330. Some example structures have been discussed in detail in preceding disclosure.

Without in any way limiting the scope, interpretation, or application of the claims appearing below, a technical effect of one or more of the example embodiments disclosed herein is improved device lifetime and user experience as a display can be folded with reduced risk of damages during folding or storage or transport.

Another technical effect of one or more of the example embodiments disclosed herein is improvement in device form factor. Various embodiments provide an apparatus structure that can accommodate folding radius of a flexible display without considerably increasing thickness of the device. Yet another technical effect of one or more of the example embodiments disclosed herein is scalability of the structure to various device thicknesses or widths or screen sizes.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
    housing parts foldably connected to each other at a folding point, the housing parts being configured to be movable between an open configuration and a closed configuration;
    a display assembly pivotably connected to the housing parts, wherein
    the display assembly comprises a flexible display part;

the flexible display part is configured to bend in response to a closing movement of the housing parts; and the display assembly is configured to be retracted inside a space, that is defined by the housing parts and that is behind a planar surface of the flexible display part in the open configuration of the housing parts, in response to a closing movement of the housing parts, wherein the display assembly further comprises frame parts, wherein each frame part is fixedly and pivotably connected to a respective housing part at a respective pivot point near an end of the respective housing part opposite the folding point such that each frame part is configured to rotate within the space about the respective pivot point in a direction opposite a direction of rotation about the folding point of the respective housing part to which the frame part is connected as the housing parts are moved between the open and closed configurations, and wherein the flexible display part is assembled on the frame parts.

2. An apparatus according to claim 1, wherein a force applied to the apparatus to move the housing parts towards the closed configuration is configured to cause retraction of the display assembly inside the space defined by the housing parts.

3. An apparatus according to claim 1, wherein the flexible display part extends over a surface of each housing part.

4. An apparatus according to claim 1, wherein the display assembly is configured to be moved outward in the space defined by the housing parts in response to an opening movement of the housing parts.

5. An apparatus according to claim 1, wherein the frame parts are configured to meet inner wall of the housing parts in the closed configuration.

6. An apparatus according to claim 1, wherein
in the closed configuration the housing parts are folded against each other and the flexible display part is hidden in a bent position inside a space defined by the housing parts.

7. An apparatus according to claim 1, wherein
in the open configuration the housing parts are folded away from each other and the flexible display part is exposed.

8. An apparatus according to claim 1, further comprising a locking mechanism configured to lock the display assembly into a certain position in dependence of the configuration of the housing parts.

9. An apparatus according to claim 1, further comprising a locking mechanism configured to lock the display assembly into at least one of the following positions in dependence of the configuration of the housing parts: an open position, a closed position and an intermediate position.

10. An apparatus according to claim 1, wherein the housing parts are made of rigid material.

11. An apparatus according to claim 1, wherein at least one of the housing parts comprises at least one resilient section.

12. An apparatus according to claim 1, wherein at least one of the housing parts comprises at least partially resilient structure.

13. A method comprising
controlling a device comprising a foldable housing structure and a display assembly pivotably connected to the housing structure, the housing structure comprising housing parts foldably connected to each other at a folding point and the display assembly comprising a flexible display part, bending the flexible display part and retracting the display assembly inside a space, that is defined by the housing structure and that is behind a planar surface of the flexible display part in an open configuration of the housing structure, in response to the device being folded towards a closed configuration, wherein the display assembly further comprises frame parts, wherein each frame part is fixedly and pivotably connected to a respective housing part at a respective pivot point near an end of the respective housing part opposite the folding point such that each frame part rotates within the space about the respective pivot point in a direction opposite a direction of rotation about the folding point of the respective housing part to which the frame part is connected as the device is being folded towards the closed configuration, and wherein the flexible display part is assembled on the frame parts.

14. A method according to claim 13, further comprising causing retraction of the display assembly inside the housing structure in response to a force being applied to the device to fold the device towards the closed configuration.

15. A method according to claim 13, further comprising moving the display assembly outward in response to an opening movement of the device.

* * * * *